United States Patent Office 3,470,123
Patented Sept. 30, 1969

3,470,123
NOVEL COMPOSITIONS OF ETHYLENE
POLYMERS AND WAX
Arleen S. Varron, Wayne, N.J., assignor to Inmont Corporation, New York, N.Y., a corporation of Ohio
No Drawing. Filed Sept. 15, 1966, Ser. No. 579,518
Int. Cl. C08f 45/52, 29/12, 29/40
U.S. Cl. 260—28.5                                11 Claims

ABSTRACT OF THE DISCLOSURE

A coating composition comprising a continuous petroleum wax phase having emulsified therein a discontinuous phase containing water in which a polyethylene homopolymer or an ethylene-vinyl acetate copolymer has been dispersed. The coating compositions have excellent barrier properties to moisture and wax and are useful as coating for paper and paperboard in the food packaging industry.

---

This invetnion relates to compositions of ethylene polymers and wax. More particularly, it relates to compositions containing ethylene polymers dispersed in water, the dispersions being emulsified in the wax.

Because of the excellent barrier properties of waxes to moisture and to odors, the food packaging industry has been seeking suitable wax coatings for paper and paperboard to be used for such items as containers for milk and other liquids, packages for frozen foods and bread wrappers. While wax alone has been used for such coatings it has been found to have less than desirable hardness, toughness and flexibility for such packages and containers, and consequently, attempts have been made to blend the wax with other polymeric materials. Among the polymeric materials which have been tried are polymers of ethylene, especially copolymers of ethylene and vinyl acetate. While such polymers should be capable of giving the desired hardness and toughness to wax coatings, many difficulties have been encountered in trying to form coatings of ethylene polymers and the copolymers of ethylene and vinyl acetate with waxes particularly the conventional waxes in the food packaging field which are petroleum waxes e.g., paraffin waxes and microcrystalline waxes.

The primary difficulty appears to reside in the fact that the ethylene polymers and copolymers to be blended are highly miscible or soluble in the melted wax which melts at from 123° to 195° F. When the vinyl acetate and ethylene copolymers, for example, dissolve in the petroleum wax, the resulting solution becomes so viscous even at copolymer contents of 10 to 20% that it is virtually impossible to coat the solution at the common temperatures of 123° to 195° F., at which the coatings of wax alone are coated.

With blends of commonly used petroleum waxes and vinyl acetate/ethylene copolymers, for example, it is necessary to use temperatures in the order of 300° F. in order to coat, and even at such high temperatures the lowest viscosities attainable are in the order of 35,000 cps. When coating at such a high viscosity, it is very difficult to control film thickness, and coatings have to be applied at greater thickness than are functionally necessary for the coating. In addition, excessive bubbling with attendant discontinuities in the film also appears to be a problem when coating at the high temperatures and viscosities. Also, because of the high viscosities involved, the coatings can not readily be applied by means of a gravure cylinder which is often a desirable method of applying coatings to food packages. Further, many waxes and ethylene polymers which were considered impractical for use in these coatings even when coated at the 300° F. temperature, now may be used in the compositions of this invention.

There has now been discovered a novel composition which blends ethylene polymers such as polyethylene or ethylene/vinyl acetate copolymers with petroleum waxes to provide the desired hardness, toughness and flexibility to the wax coatings but eliminates the disadvantages due to high temperatures and viscosities of the previously described blends of waxes with polyethylene polymers.

The novel coating compositions of this invention comprise a continuous petroleum wax phase having emulsified therein a discontinuous phase containing water in which the ethylene polymer has been dispersed. During storage, the discontinuous phase is maintained when the wax phase is solid as well as when the wax phase melts so long as the temperature of the composition does not reach 212° F., the boiling point of water. The emulsion may be maintained through multiple meltings and refreezing of the wax. At the melting point of wax, (123° to 195° F.) the composition has a relatively low viscosity in the order of from 25 to 1,000 cps., is easy to handle and may be applied to a substrate as a thin uniform film without any bubbling problem. In addition, the composition has a sufficiently low viscosity that it may be applied by conventional gravure cylinders as well as other existing conventional equipment used for wax coating.

The unexpected differences in properties of the emulsion of this invention over blends of waxes and ethylene polymers is believed to be due to the action of the water surrounding the polymers which prevents the polymers dispersed therein from being dissolved in the continuous wax phase.

After the film has been applied, as a film having a thickness preferably in the order of from 0.1 to 1.0 mil, a relatively low temperature may be used to bring about a fusion of the remaining ethylene polymer and the wax. In fact, temperatures just in excess of the melting point of the wax would be sufficient. It appears that in the film, the water no longer acts to prevent the fusion of the ethylene polymer and the wax. The water in film appears to evaporate and/or to be absorbed into the substrate if the substrate is an absorbent material to such an extent that it no longer prevents the fusion. While heating the film to temperatures just in excess of the melting point of the wax would be sufficient to fuse the components, for best results a temperature in excess of 200° F. is preferred because less time is required at this temperature to bring about the fusion.

The novel compositions of this invention may be prepared as follows:

The dispersion of the ethylene polymer in water may be made in the conventional manner known to those skilled in the art. In forming such a dispersion an anionic surfactant may be used if desired. Sodium lauryl sulfate is a typical anionic surfactant which may be used. The aqueous dispersion in water is then emulsified in the melted wax using a nonionic surfactant such as glyceryl monooleate or nonyl phenyl polyethylene glycol.

In the food packaging field, the waxes conventionally used are petroleum waxes such as paraffin or microcrystalline wax.

It has been found that the best properties for the food packaging field appear to result when a copolymer of ethylene and vinyl acetate is used. Preferably, a major portion of this copolymer is ethylene and most preferably the vinyl acetate content is from 25% to 30% the weight of the polymer.

Preferably, in the compositions, from 20 to 50 parts of the ethylene polymer are used for each part wax, and from 0.8 to 1.2 parts of water are used for each part of ethylene polymer. It should be noted that unless otherwise stated all proportions in the specification and claims are by weight.

The following examples will illustrate the practice of this invention:

Example 1

75 parts of paraffin wax are melted at 123° F. in a high speed mixer. Then, 0.5 part of a nonionic surfactant, glyceryl monooleate, is added to the wax. Next, 50 parts of a 50% emulsion in water of a copolymer comprising 72% ethylene and 28% vinyl acetate containing 0.5 part of sodium lauryl sulfate is added slowly to the wax over a period of 5 to 10 minutes while maintaining the mixture at about 140° F. At 140° F., the mixture has a viscosity of 40 cps. The mixture is then permitted to cool to room temperature at which is solidifies. Microscopic examination reveals that the solid consists of a solid continuous paraffin wax phase having emulsified therein droplets of water which contain dispersed copolymer.

After a storage or shelf period the material is again melted by the application of a temperature of about 140° F. The milled emulsion is applied onto cardboard stock as a continuous coating by a gravure cylinder, after which the applied coating is heated to 300° F. by means of a hot roller. The coating is permitted to cool. The resulting coating is very tough, quite flexible and forms a moisture barrier.

Example 2

Example 1 is repeated using the same ingredients, proportions, conditions and procedure except that in place of paraffin wax, there is used microcrystalline wax and that the mixture is maintained at 180°–190° F. which is above the 163–169° F. melting point of the microcrystalline wax instead of at 140° F. The results are the same as in Example 1.

Example 3

Example 1 is repeated using the same ingredients, proportions, conditions and procedure except that in place of the copolymer of ethylene and vinyl acetate, there is used a homopolymer of polyethylene. The results are the same as in Example 1 except that the resulting coating it not as flexible as the coating of Example 1.

While there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A coating composition comprising a dispersion in which the discontinuous phase is a polymer selected from the group consisting of a polyethylene homopolymer and a copolymer of ethylene and vinyl acetate in water which dispersion is emulsified in a petroleum wax, said wax being the continuous phase.

2. The composition of claim 1 wherein said polymer is a polyethylene homopolymer.

3. The composition of claim 1 wherein said polymer is a copolymer of vinyl acetate and ethylene.

4. The composition of claim 1 wherein said wax is liquid.

5. The composition of claim 1 wherein said wax is solid.

6. The composition of claim 11 wherein said wax is paraffin wax.

7. The composition of claim 1 wherein said wax is microcrystalline.

8. The composition of claim 3 wherein said copolymer contains a major portion of ethylene and the remainder vinyl acetate.

9. A method of coating a substrate comprising applying to said substrate a film of the composition of claim 1 at a temperature above the melting point of the wax and below the boiling point of water and then heating the coated substrate at a temperature above the melting point of the wax to fuse the wax and copolymer into a continuous coating.

10. A method of making a coating composition dispersion comprising,
(a) dispersing a polymer selected from the group consisting of polyethylene homopolymers and copolymers of polyethylene and vinyl acetate in water which is the continuous phase, and
(b) emulsifying the resulting dispersion in a petroleum wax, said wax being the continuous phase.

11. The method of claim 10 wherein said polymer is a copolymer of ethylene and vinyl acetate.

References Cited

UNITED STATES PATENTS

| | | |
|---|---|---|
| 2,290,794 | 7/1942 | Alvardo. |
| 2,859,190 | 11/1958 | Cubberley. |
| 2,908,578 | 10/1959 | Barker. |
| 2,964,487 | 12/1960 | Chapman. |
| 3,234,158 | 2/1966 | Pfluger. |
| 3,247,141 | 4/1966 | Stryker. |
| 3,328,326 | 6/1967 | Sawyer _____ 260—28.5 |
| 3,272,690 | 9/1966 | Shadan. |

MORRIS LIEBMAN, Primary Examiner
H. K. KAPLAN, Assistant Examiner

U.S. Cl. X.R.
117—161